(12) United States Patent
Romanelli

(10) Patent No.: US 9,352,698 B2
(45) Date of Patent: May 31, 2016

(54) UNIVERSAL MOUNT SYSTEM FOR PICKUP TRUCK BED

(71) Applicant: EXTANG CORPORATION, Ann Arbor, MI (US)

(72) Inventor: Robert Romanelli, Savannah, GA (US)

(73) Assignee: Extang Corporation, Ann Arbor, MI (US)

( * ) Notice: Subject to any disclaimer, the term of this patent is extended or adjusted under 35 U.S.C. 154(b) by 4 days.

(21) Appl. No.: 14/245,231

(22) Filed: Apr. 4, 2014

(65) Prior Publication Data

US 2015/0283953 A1    Oct. 8, 2015

(51) Int. Cl.
*B60R 9/06* (2006.01)
*B60R 11/00* (2006.01)

(52) U.S. Cl.
CPC . *B60R 9/06* (2013.01); *B60R 11/00* (2013.01); *B60R 2011/0059* (2013.01); *B60R 2011/0085* (2013.01)

(58) Field of Classification Search
CPC ............ B60R 9/00; B60R 9/06; B60R 9/048; B60R 9/055; B60R 9/065; B60R 7/08; B60R 7/00; B60R 7/02; B60R 2011/0036; B60R 2011/004; B60R 2011/0042; B60R 2011/008; B60R 2011/0084; B60R 2011/0094; B62D 33/00; B62D 33/02; B62D 33/0207; B62D 33/023; B62D 33/027; B62D 33/04; B62D 33/077; B62D 33/08; B62D 33/10
USPC .......................................... 280/769, 762, 727
See application file for complete search history.

(56) References Cited

U.S. PATENT DOCUMENTS

| | | | | | |
|---|---|---|---|---|---|
| 4,085,961 | A | * | 4/1978 | Brown | 296/37.6 |
| 4,236,854 | A | * | 12/1980 | Rogers | 410/121 |
| 4,564,167 | A | * | 1/1986 | Smith | 248/552 |
| 4,647,110 | A | * | 3/1987 | McKee | 298/1 A |
| 5,603,439 | A | * | 2/1997 | Pineda | 224/403 |
| 5,882,085 | A | * | 3/1999 | Pekarek | 298/1 A |
| 6,024,402 | A | * | 2/2000 | Wheatley | 296/100.18 |
| 6,077,024 | A | * | 6/2000 | Trueblood | 414/462 |
| 6,158,761 | A | * | 12/2000 | King | 280/495 |
| 6,507,701 | B2 | * | 1/2003 | Lake | 296/37.6 |
| 6,588,720 | B1 | * | 7/2003 | Revette | 224/403 |
| 6,626,479 | B1 | * | 9/2003 | Skoug | 296/37.6 |
| 6,929,303 | B1 | * | 8/2005 | Sharples | 296/37.6 |
| 7,073,867 | B2 | * | 7/2006 | Huenke | 298/1 A |
| 7,111,884 | B2 | * | 9/2006 | Johnson | 296/26.1 |
| 7,309,093 | B2 | * | 12/2007 | Ward | 296/37.6 |
| 8,281,967 | B2 | * | 10/2012 | Evans | 224/404 |

(Continued)

*Primary Examiner* — James M Dolak
(74) *Attorney, Agent, or Firm* — Harness, Dickey & Pierce, PLC

(57) ABSTRACT

A universal mounting system for mounting an accessory in a pickup truck bed. The system includes a main support member having an upper end and a lower end, wherein the upper end is engageable with the upper horizontal portion of the sidewall of the pickup truck bed and the lower end is engageable with the floor of the pickup truck bed. The main support member includes a transverse channel. The universal mounting system further includes a cantilever member extending through at least a portion of the transverse channel of the main support member. The cantilever member has a mounting system defining a pivot axis. A swivel plate is connectable to the accessory and includes a mounting system pivotally engaging the mounting system of the cantilever member to define a pivotal connection along the pivot axis therebetween to permit the accessory to pivot about the pivot axis.

20 Claims, 6 Drawing Sheets

(56) References Cited

U.S. PATENT DOCUMENTS

| | | | |
|---|---|---|---|
| 8,636,182 B1 * | 1/2014 | Gordon | 224/404 |
| 9,120,427 B1 * | 9/2015 | Wolski | |
| 9,193,138 B2 * | 11/2015 | Arai et al. | |
| 9,193,290 B2 * | 11/2015 | Lazarevich et al. | |
| 2003/0189353 A1 * | 10/2003 | Moore | 296/37.6 |
| 2006/0102669 A1 * | 5/2006 | Fouts et al. | 224/404 |

* cited by examiner

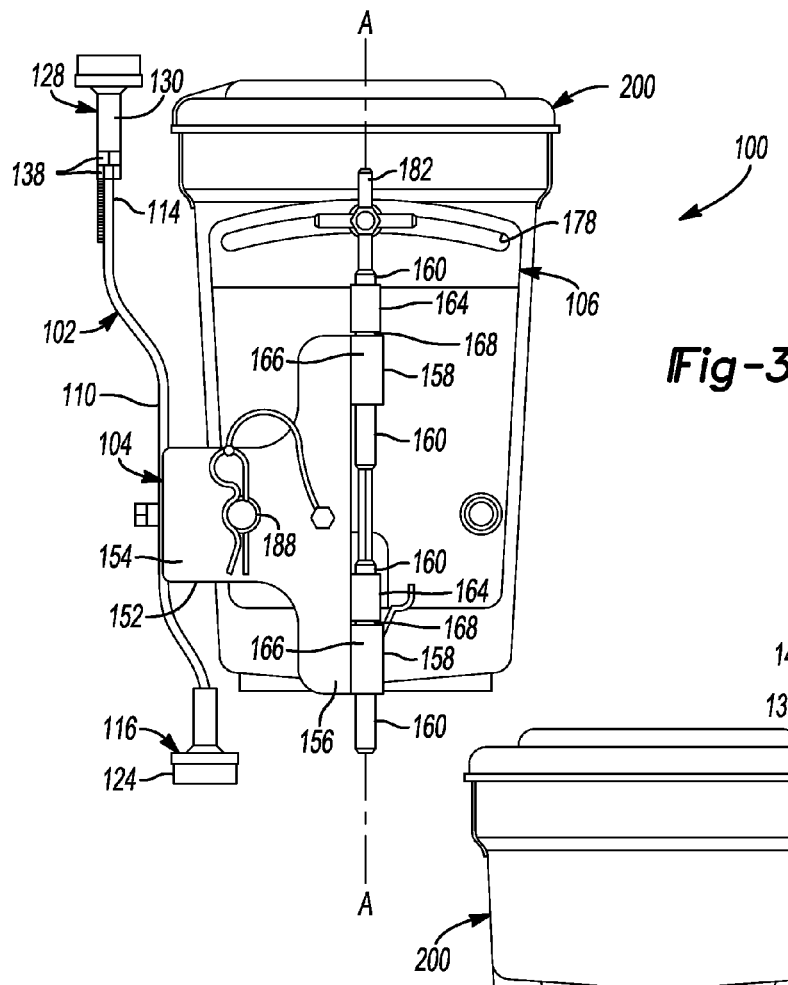
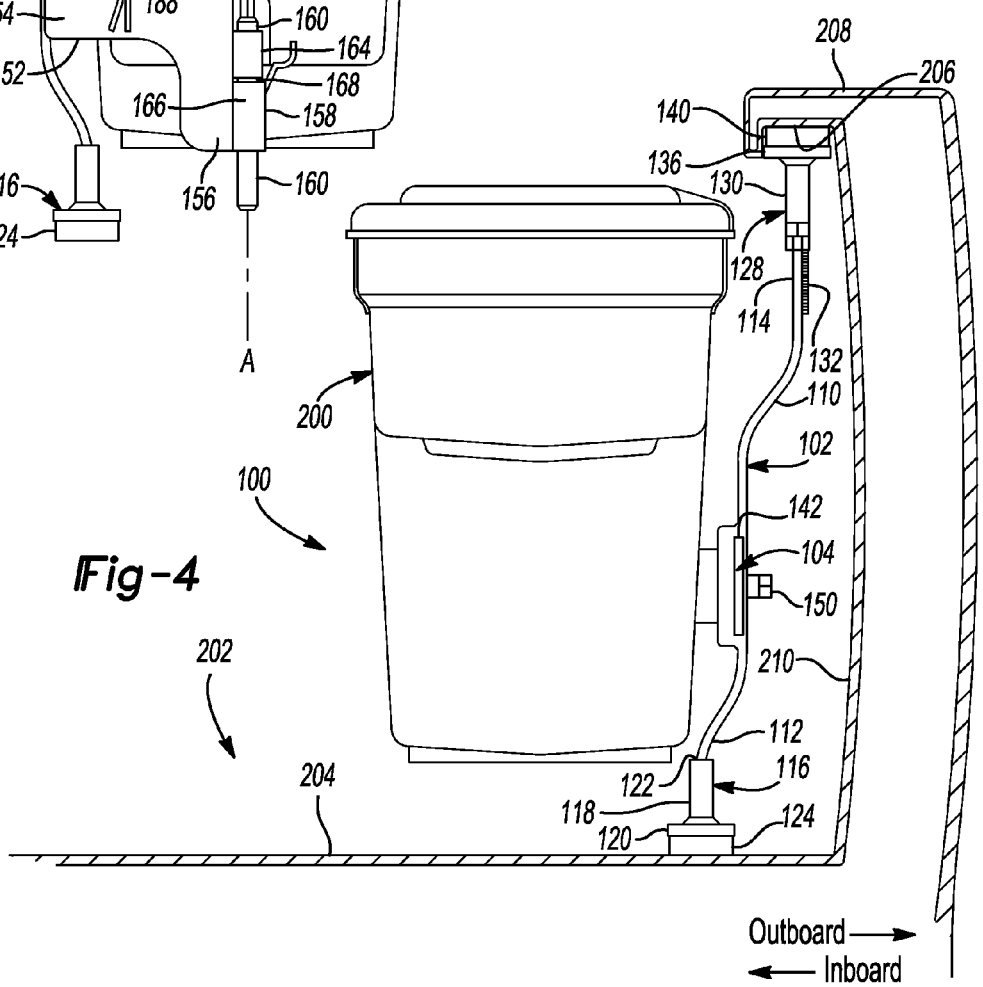
Fig-3
Fig-4

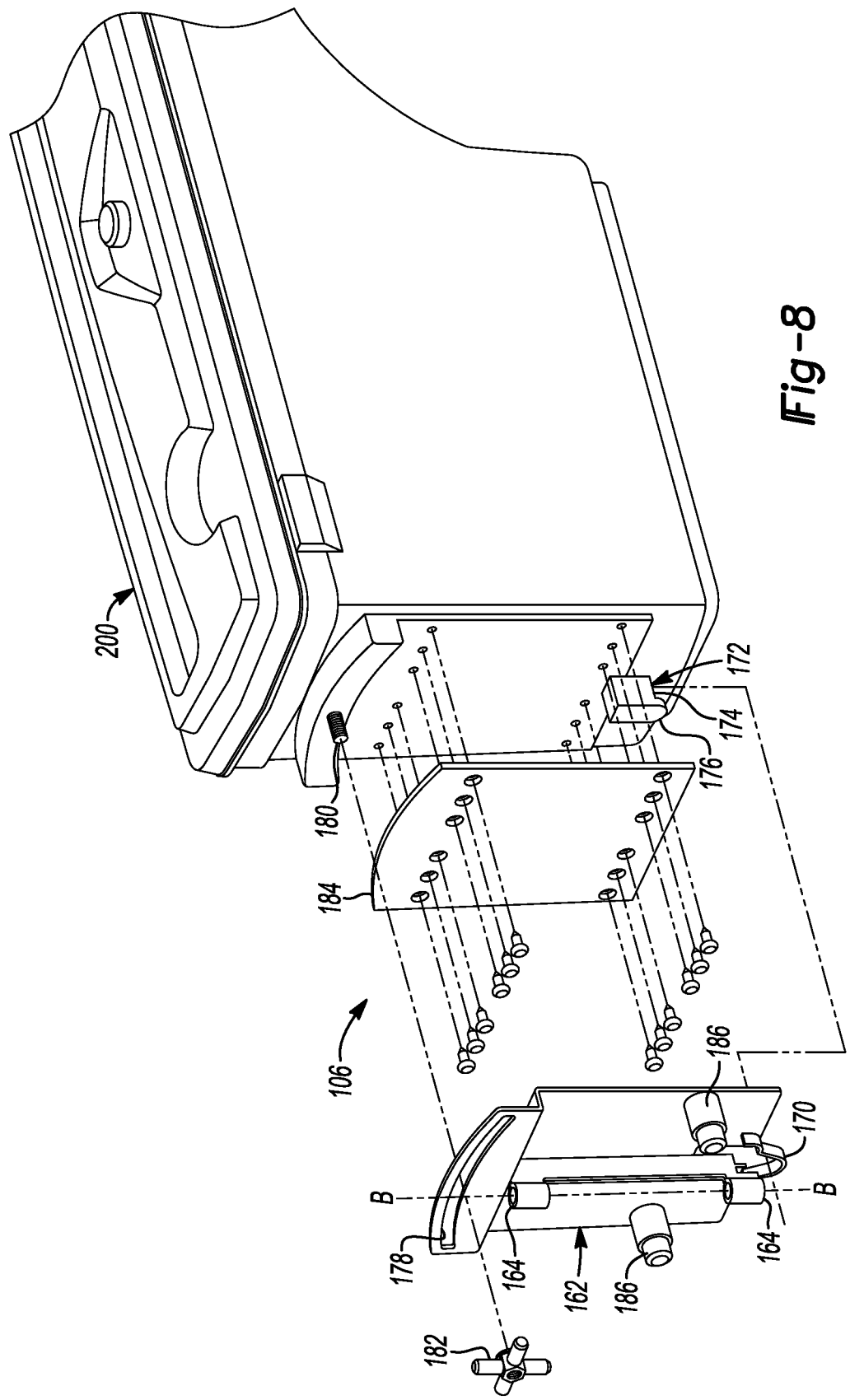

UNIVERSAL MOUNT SYSTEM FOR PICKUP TRUCK BED

FIELD

The present disclosure relates to storage system and, more particularly, relates to a universal mount system for a storage system for use in a pickup truck bed.

BACKGROUND

This section provides background information related to the present disclosure which is not necessarily prior art.

As is commonly known, pickup trucks can be used for a wide variety of applications, such as off-road applications, construction, hauling, towing, and the like. Similarly, pickup trucks tend to be used with a similar wide variety of accessories that are particularly suited for one or more of these unique applications. These accessories often include tool boxes, cargo boxes, coolers, or other storage items.

In some cases, such as mounted tool or cargo boxes, these items are nearly permanently affixed in the bed of the pickup truck, most often near the passenger cabin. These mounted tool or cargo boxes consume a substantial volume of the pickup bed and are generally difficult to install and remove. Therefore, typically, once a tool or cargo box is installed in the pickup bed, they are rarely removed.

In other cases, such accessories are loosely mounted in the pickup bed and, thus, have the potential to slide or otherwise move within the pickup bed during travel. Of course these accessories can be tethered to a mounting cleat or tiedown in the pickup bed, but unfortunately such tethering is cumbersome and often results in the accessory being mounted in a less than ideal position within the pickup bed.

Finally, in light of the current leasing programs and short term ownership of many pickup trucks, owners desire methods of accessorizing their pickup trucks without causing permanent damage to the vehicle. By maintaining in the pickup truck in a condition as close to as-new, the owner is less likely of being assessed damage fees or reduced valuation.

Accordingly, there exists a need in the relevant art to provide a universal mounting system for mounting accessories within a pickup bed to permits use in a wide variety of applications. Moreover, there exists a need in the relevant art to provide a universal mounting system that can be used in connection with a wide variety of accessories. Still further, there exists a need in the relevant art to provide a universal mounting system that is capable of mounting the accessories in a conducive and accessible position in the pickup bed. Moreover, there exists a need in the relevant art to provide a universal mounting system that is capable of being used to reliably retaining accessories in the pickup bed without causing permanent damage or requiring permanent modification of the pickup bed. Finally, there exists a need in the relevant art to overcome the disadvantages of the prior art.

SUMMARY

This section provides a general summary of the disclosure, and is not a comprehensive disclosure of its full scope or all of its features.

According to the principles of the present teachings, a universal mounting system for mounting an accessory in a pickup truck bed is provided having advantageous construction. The system includes a main support member having an upper end and a lower end, wherein the upper end is engageable with the upper horizontal portion of the sidewall of the pickup truck bed and the lower end is engageable with the floor of the pickup truck bed. The main support member includes a transverse channel. The universal mounting system further includes a cantilever member extending through at least a portion of the transverse channel of the main support member. The cantilever member has a mounting system defining a pivot axis. A swivel plate is connectable to the accessory and includes a mounting system pivotally engaging the mounting system of the cantilever member to define a pivotal connection along the pivot axis therebetween to permit the accessory to pivot about the pivot axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates a first side view of the universal mounting system for mounting an accessary in a pickup truck bed according to the principles of the present teachings;

FIG. 4 illustrates a second side view of the universal mounting system for mounting an accessary in a pickup truck bed according to the principles of the present teachings;

FIG. 8 illustrates an exploded perspective view of the swivel plate and accessory according to the principles of the present teachings.

Corresponding reference numerals indicate corresponding parts throughout the several views of the drawings.

DETAILED DESCRIPTION

Figure 1:
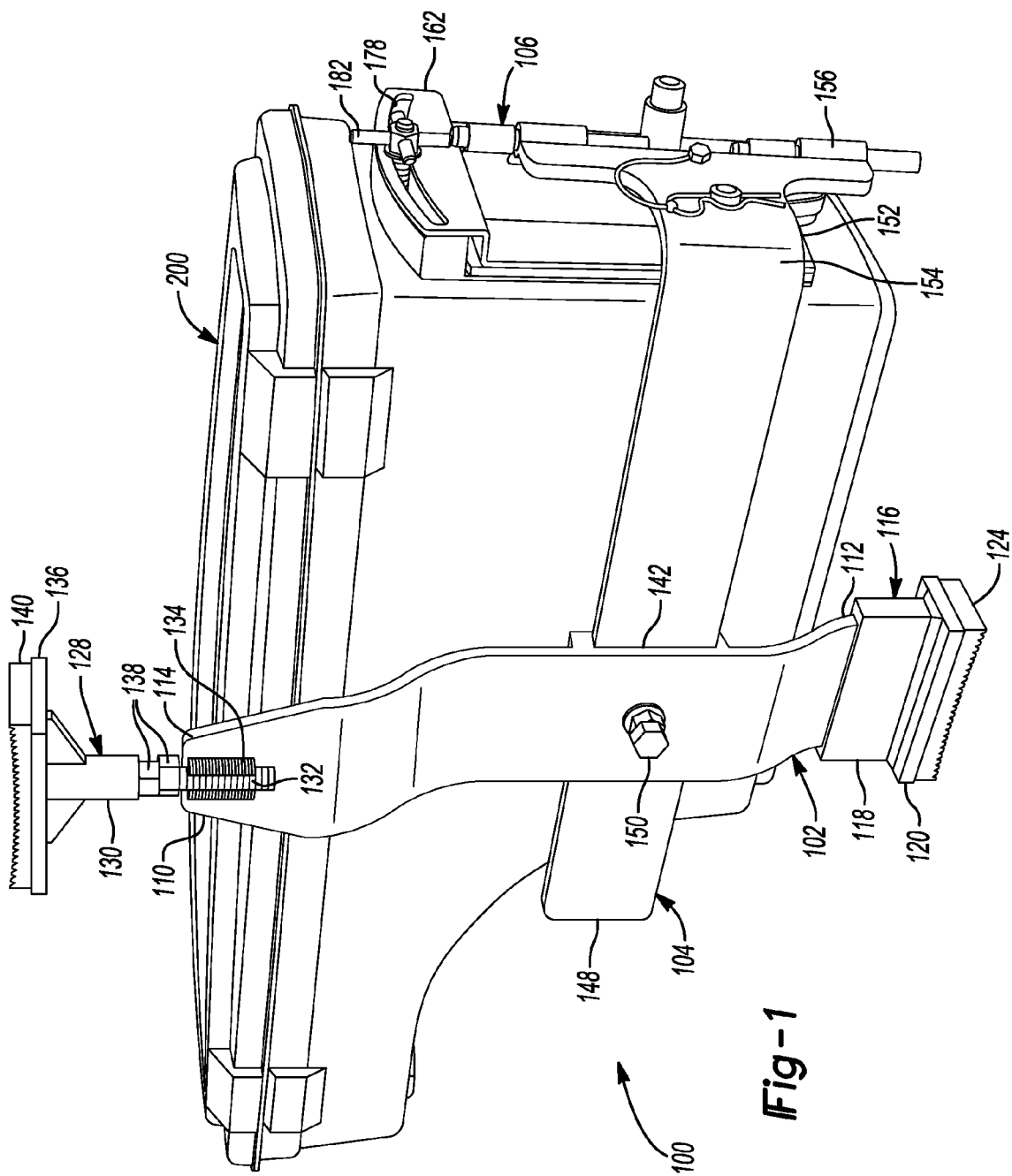
FIG. 1 illustrates a perspective view of a universal mounting system for mounting an accessary in a pickup truck bed according to the principles of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-8, a universal mounting system 100 for pickup truck beds is illustrated according to some embodiments of the present teachings. In these embodiments, universal mounting system 100 can comprise a main support member 102, a cantilever support member 104, and pivot/tilt accessory support bracket assembly 106. Universal mounting system 100 is configured for particular use with an accessory 200. In some embodiments, accessory 200 can comprise a tool box, cargo box, cooler, platform, or other member that is desired to be mounted in a pickup bed and pivoted between a stored position and a deployed position. Although the present invention will be discussed in connection with a storage container 200, it should be understood that the scope of the present invention should not be limited thereto unless specifically recited as such.

With particular reference to FIGS. 1-4, in some embodiments, main support member 102 can comprise a generally upstanding member 110 having an elongated shape defining a lower end 112 and an upper end 114. In some embodiments, upstanding member 110 can define an arcuate or curved profile (see FIGS. 1-6) such that lower end 112 and upper end 114 are offset relative to each other when mounted in a pickup truck bed. That is, as illustrated in FIGS. 3-4, generally upstanding member 110 can be configured such that upper end 114 can be positioned further outboard (relative to the vehicle) than lower end 112. As will be discussed, these configuration permits proper positioning and mounting to a sidewall of the pickup truck bed.

In some embodiments, generally upstanding member 110 can comprises a base support member 116 being connectable with lower end 112 of generally upstanding member 110. In some embodiments, base support member 116 can be releasably mounted to lower end 112 of upstanding member 110. To this end, base support member 116 can comprise an upstanding slot member 118 being integrally formed with a generally planar flange portion 120. Upstanding slot member 118 can comprise a slot 122 (FIG. 7) formed therein that is sized to closely conform to and receive lower end 112 of upstanding member 110 therein. Flange portion 120 defines a generally planar section having a mounting pad 124 (e.g. rubber mounting pad) affixed thereto. Mounting pad 124 is configured to engage the floor 204 of the pickup truck bed 202 without causing damage or requiring permanent modification (see FIG. 4).

It should be understood that, in some embodiments, upstanding member 110 can comprise an integrally formed base support member 116. However, it should also be understood that in those embodiments using a separate base support member 116, adjustment shims 126 (FIG. 7) can be used to provide increased vertical adjustment of main support member 102 and, thus, universal mounting system 100. That is, in some embodiments, adjustment shims 126 having a predetermined height can be inserted into slot 122 of base support member 116 to provide an internal physical stop and thus shim base support member 116 into a higher position. Adjustment shims 126 can be provided in a plurality of sizes to permit a single universal mounting system 100 to be used in a wide variety of pickup truck beds having varying dimensions—by the manufacturer and/or user. By way of example, adjustment shims 126 having increment sizes ranging up to 1.5 inches have been used. However, additional size variations are envisioned and within the scope of the present teachings.

With continued reference to FIGS. 1-6, in some embodiments, In some embodiments, generally upstanding member 110 can comprises a top support member 128 being connectable with upper end 114 of generally upstanding member 110. In some embodiments, top support member 128 can be releasably mounted to upper end 114 of upstanding member 110 to provide an adjustable length mechanism. To this end, top support member 128 can comprise a fastener receiving section 130 being integrally formed with a generally planar flange portion 136. Fastener receiving section 130 can comprise a generally cylindrical section having a fastener 132 threadedly engaged therein. Fastener 132 can extend from fastener receiving section 130 and be received within a fastener mounting member 134 coupled to upper end 114 of upstanding member 110. Fastener mounting member 134 can be integrally formed with upper end 114 or coupled thereto to provide a reliable, threaded coupling of fastener 132, and thus top support member 128, to upstanding member 110. Fastener 132 can comprise a pair of locking nuts 138 to permit locking installation and adjustment of an overall length of fastener 132, thereby permitting the adjustment and locking of the overall length between top support member 128 and base support member 116. Flange portion 136 defines a generally planar section having a mounting pad 140 (e.g. rubber mounting pad) affixed thereto. As illustrated in FIG. 4, mounting pad 140 is configured to engage the underside 206 of the upper horizontal sidewall flange 208 of sidewall 210 of the pickup truck bed 202 without causing damage or requiring permanent modification. This upper horizontal sidewall flange or portion can include the underside horizontal surface of the sidewall, namely the underside surface of the sidewall caps of the pickup truck bed.

Figure 2:
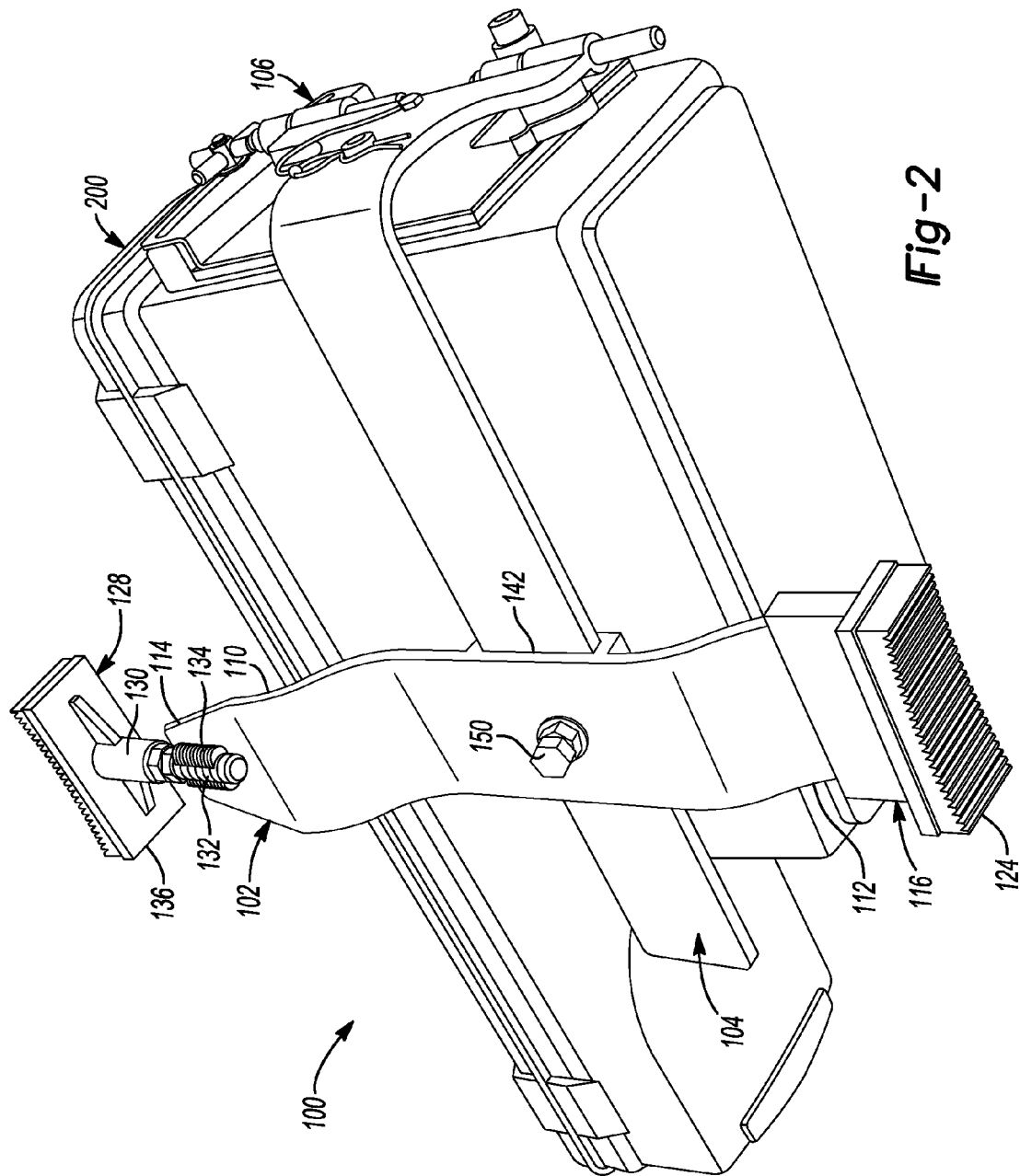
FIG. 2 illustrates a bottom perspective view of the universal mounting system for mounting an accessary in a pickup truck bed according to the principles of the present teachings.
Figure 5:
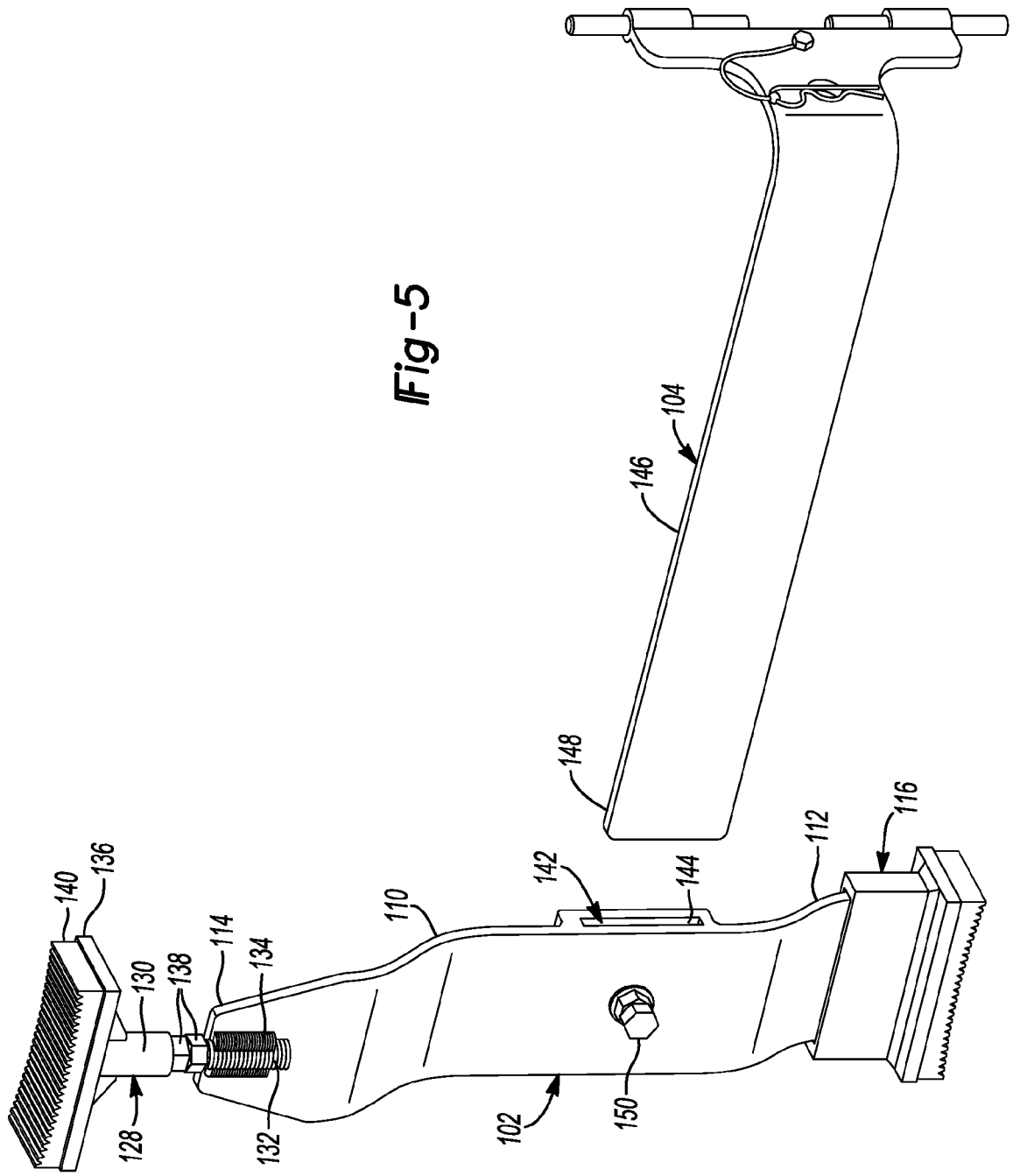
FIG. 5 illustrates an exploded perspective view of the main support member and the cantilever member according to the principles of the present teachings.
Figures 6, 7:
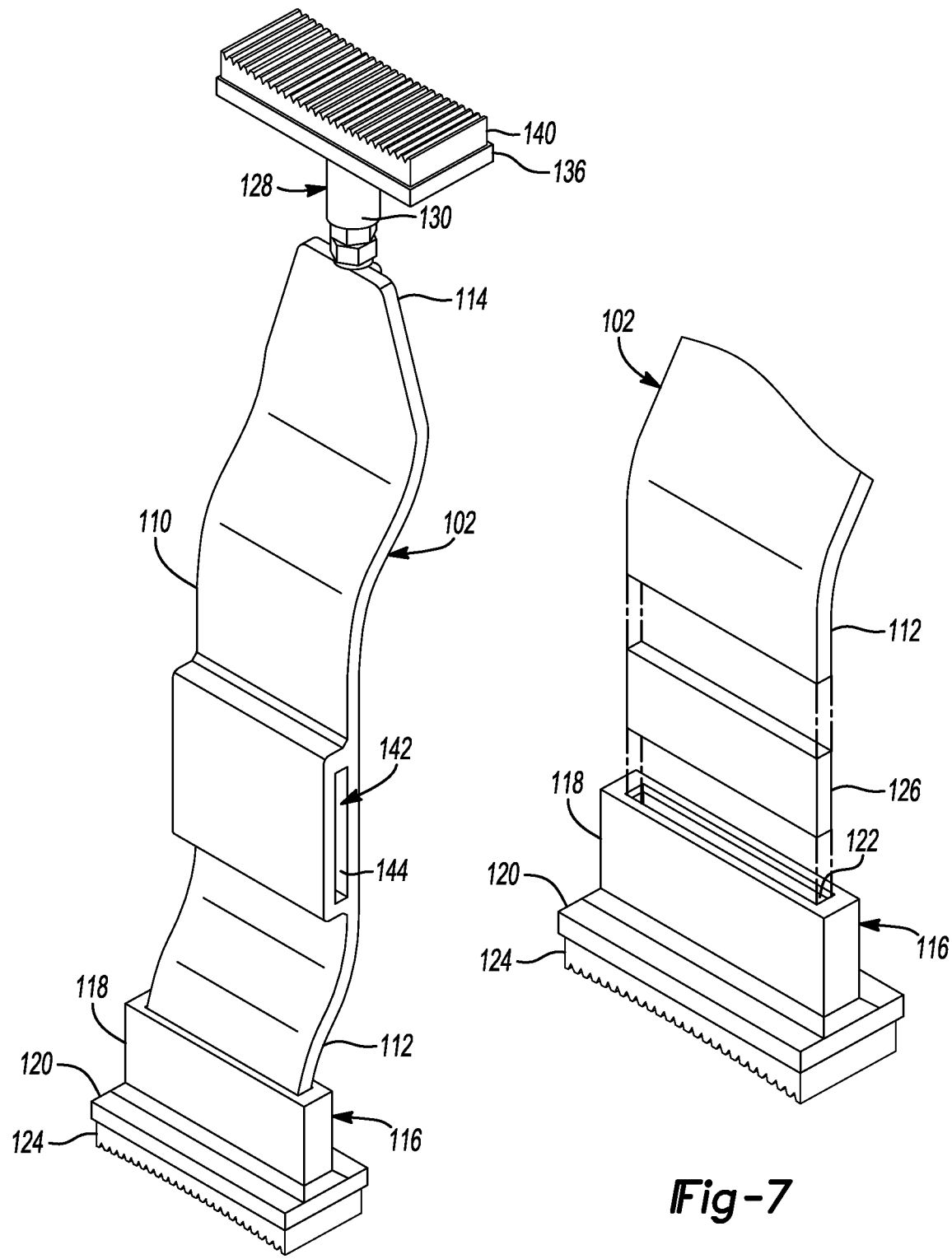
FIG. 6 illustrates a perspective view of the main support member according to the principles of the present teachings.
FIG. 7 illustrates an enlarged perspective view of the lower end of the main support member according to the principles of the present teachings.

With particular reference to FIGS. 1-6, in some embodiments, main support member 102 can comprise a transverse channel 142 being integrally formed along upstanding member 110 at a position between upper end 114 and lower end 112. In some embodiments, transverse channel 142 can be positioned at about a midpoint location along said upstanding member 110. This position can represent a generally vertical section of upstanding member 110. Transverse channel 142, in some embodiments, comprises an enclosed channel member having at least one channel opening 144 (FIGS. 5-6). Transverse channel 142 is sized and shaped to closely conform to and permit cantilever member 104 to be slidingly received within transverse channel 142 through the at least one channel opening 144. In some embodiments, transverse channel 142 comprises opposing channel openings 144 to permit cantilever member 104 to be received in transverse opening from either direction. As should be understood, this configuration, in part, permits universal mounting system 100 to be mounted on either side of a pickup truck bed without major modification. As can be seen in FIGS. 1, 2, and 5, cantilever member 104 is particularly suited to be received within transverse channel 142 such that a longitudinal axis of cantilever member 104 is generally horizontal and orthogonal to a longitudinal axis of main support member 102. Cantilever member 104 can define a generally constant size and shape along an adjustment arm section 146 (FIG. 5) to permit sliding movement and adjustment of cantilever member 104 relative to main support member 102. A distal end 148 of cantilever member 104 can be inserted into transverse channel 142 and slid to a desired position to permit proper positioning of accessory 200 within the pickup truck bed. Once a desired position of cantilever member 104 is achieved, a locking member 150, such as a fastener having a distal end projecting into transverse channel 142, can be tightened to engage, capture, and retain cantilever member 104 in transverse channel 142 in the desired position.

As seen in FIGS. 1, 3 and 5, in some embodiments, cantilever member 104 can comprise a pivot support portion 152. Pivot support portion 152 can be formed orthogonal relative to adjustment arm section 146 in an inboard direction. Pivot support portion 152 can comprise a main central section 154 being integrally formed with adjustment arm section 146. The main central section 154 can be integrally formed with a generally U-shaped section 156. Generally U-shaped section 156 can comprise a pair of inboardly directed ends 158 each having a vertically oriented pair of pivot rods 160. Pivot rods 160 are commonly aligned along a pivot axis A-A (FIG. 3). Each pivot rod 160 is generally cylindrically shaped to provide for pivoting movement of accessory 200 about pivot axis A-A. To this end, pivot axis A-A is generally vertically oriented. In some embodiments, four pivot rods 160 are provided. However, in many applications, only two pivot rods 160 are used for pivoting movement of accessory 200. The remaining two pivot rods 160 are provided so that universal mounting system 100 can be used on an opposing side of the pickup truck bed, thereby flipping cantilever member 104 and cause the remaining two pivot rods 160 to become the used pivot rods.

As seen in FIGS. 1, 3, and 8, pivot rods 160 of cantilever member 104 are sized to engage pivot/tilt accessory support bracket assembly 106. Specifically, in some embodiments, pivot/tilt accessory support bracket assembly 106 comprises a swivel plate 162 that can be integrally formed with or coupled to accessory 200. Swivel plate 162 can comprise a pair of female pivot slots 164 being aligned along a pivot axis B-B (FIG. 8). Female pivot slots 164 are sized, shaped, and spaced apart to permit female pivot slots 164 to be lifted and inserted onto pivot rods 160 of cantilever member 104 (see FIGS. 1 and 3). The weight of pivot/tilt accessory support bracket assembly 106 and accessory 200 is supported by the engagement of female pivot slots 164 and pivot rods 160. More particularly, the weight of pivot/tilt accessory support bracket assembly 106 and accessory 200 is supported by the engagement of female pivot slots 164 and the enlarged section 166 (FIG. 3) of pivot rods 160 along a bearing surface 168 (FIG. 3).

It should be understood that, in the interest of brevity, cantilever member 104 is described as having pivot rods 160 and similarly swivel plate 162 is described as having pivot slots 164. However, it should also be understood that the association of the pivot rods and pivot slots can be reversed, such that cantilever member 104 comprises pivot slots and swivel plate 162 comprises pivot rods. Both of these embodiments are intended to be within the scope of the present disclosure.

In some embodiments, swivel plate 162 can comprise a resting knob cradle 170 along a lower portion thereof. In some embodiments, resting knob cradle 170 is generally V-shaped and sized to engage a corresponding resting knob 172 extending from accessory 200. Resting knob 172 can comprise a smooth lower surface 174 for engaging resting knob cradle 170 to provide a smooth bearing surface therebetween. An enlarged flange 176 can extend from resting knob 172 to project beyond an end of resting knob cradle 170 to capture resting knob cradle 170 to help retain accessory 200 to swivel plate 162 and permit tilting movement of accessory 200 relative to swivel plate 162, cantilever member 104, and main support member 102.

In some embodiments, to further facilitate tilting movement of accessory 200 relative to swivel plate 162 et al., swivel plate 162 further can comprise an arcuate tilt slot 178. Arcuate tilt slot 178 can comprise or define a curve having a center aligned with a rotational point of resting knob 172 and resting knob cradle 170. Arcuate tilt slot 178 can further be sized to receive a tilt rod 180 extending from accessory 200. Tilt rod 180 can pass along arcuate tilt slot 178 to define a permitted range of tilt of accessory 200. In some embodiments, accessory 200 can tilt about a generally horizontal axis up to about 45 degrees inboard or outboard relative to the vehicle. In some embodiments, tilt rod 180 is a threaded member capable of threadedly engaging a corresponding tilt locking nut 182. To this end, tilt rod 180 can extend through arcuate tilt slot 178 and engage tilt locking nut 182. Tilt locking nut 182 can be threadedly tightened toward accessary 200 to capture swivel plate 162 to retaining accessory 200 in the selected tilt orientation. To facilitate smooth tilting operation, in some embodiments, an anti-friction plate 184 can be mounted between swivel plate 162 and accessory 200 via a plurality of fasteners to provide reduced friction.

In some embodiments, accessory 200 can be pivoted between a stored position and a deployed position. In the stored position, accessory 200 is pivoted and nestled generally adjacent main support member 102 and along a sidewall of the pickup truck bed. In this stored position, accessary 200 can be retained to prevent movement toward the deployed position. To this end, swivel plate 162 can comprise at least one pivot retaining post 186 extending therefrom. Pivot retaining post 186 is sized and positioned to be received through a retaining slot 188 formed in pivot support portion 152 of cantilever member 104. In this position, a clevis pin or other retaining member 190 can be extended or engaged with pivot retaining post 186 (e.g. via an aperture formed through pivot retaining post) to lock accessory 200 relative to cantilever member 104 thereby inhibiting rotation to the deployed position. A second pivot retaining post 186 can be provide to again permit mounting of universal mounting system 100 on an alternative side of the pickup truck bed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A universal mounting system for mounting an accessory in a pickup truck bed, the pickup truck bed having a floor and a sidewall, the sidewall having an upper horizontal portion, the universal mounting system comprising:
 a main support member having an upper end and a lower end, the upper end engageable with the upper horizontal portion of the sidewall of the pickup truck bed, the lower end engageable with the floor of the pickup truck bed, the main support member having a transverse channel;
 a cantilever member extending through at least a portion of the transverse channel of the main support member; and
 a swivel plate being connectable to the accessory, the swivel plate pivotally engaging the cantilever member to define pivot axis, the accessory being spaced apart from the main support member and capable of pivoting about the pivot axis;
 wherein the swivel plate comprises an arcuate slot and a resting knob cradle, the arcuate slot receiving a tilt rod extending from the accessory and the resting knob cradle receiving a resting knob extending from the accessory, the arcuate slot and resting knob cradle operable to permit tilting of the accessory about a generally horizontal axis.

2. The universal mounting system according to claim 1 wherein the pivot axis is generally vertical.

3. The universal mounting system according to claim 1 wherein the cantilever member is selectively retained within the transverse channel of the main support member.

4. The universal mounting system according to claim 1 wherein the upper end of the main support member is engageable with the upper horizontal portion of the sidewall of the pickup truck bed without requiring permanent modification of the upper horizontal portion of the sidewall of the pickup truck bed.

5. The universal mounting system according to claim 1 wherein the lower end of the main support member is engageable with the floor of the pickup truck bed without requiring permanent modification of the floor.

6. The universal mounting system according to claim 1, further comprising:
 a retaining post extending from the accessory, the retaining post being sized to be received within an aperture formed in the cantilever member, the retaining post being selectively retained relative to the cantilever member to prevent the accessory from pivoting about the pivot axis.

7. The universal mounting system according to claim 1 wherein the main support member comprises a base support member releasably coupled to the lower end, the base support member having a mounting pad engageable with the floor of the pickup truck bed.

8. The universal mounting system according to claim 7, further comprising an adjustment shim disposed between the lower end and the base support, the adjustment shim varying an overall length of the main support member.

9. The universal mounting system according to claim 1 wherein the main support member comprises a top support member, the top support member having a mounting pad engageable with the upper horizontal portion of the sidewall of the pickup truck bed.

10. The universal mounting system according to claim 9 wherein the top support member comprises an adjustable length mechanism, the adjustable length mechanism varying an overall length of the main support member.

11. The universal mounting system according to claim 1 wherein the cantilever member extends through at least a portion of the transverse channel of the main support member and is slidably moveable relative to the main support member.

12. A universally mounted accessory for use in a pickup truck bed, the pickup truck bed having a floor and a sidewall, the sidewall having an upper horizontal portion, the universally mounted accessory comprising:
 a main support member having an upper end and a lower end, the upper end engageable with the upper horizontal portion of the sidewall of the pickup truck bed, the lower end engageable with the floor of the pickup truck bed, the main support member having a transverse channel;
 a cantilever member slidably extending through at least a portion of the transverse channel of the main support member, the cantilever member having a pivot mount defining a pivot axis;
 an accessory; and
 a swivel plate coupled to the accessory, the swivel plate having a complementary pivot mount pivotally engaging the pivot mount of the cantilever member to define a pivotal connection along the pivot axis therebetween to permit the accessory to pivot about the pivot axis;
 wherein the accessory comprises a tilt rod extending therefrom and a resting knob extending therefrom, the swivel plate comprises an arcuate slot and a resting knob cradle, the arcuate receiving the resting knob extending from the accessory and the resting knob cradle receiving the resting knob extending from the accessory, the arcuate slot and resting knob cradle operable to permit tilting of the accessory about a generally horizontal axis.

13. The universally mounted accessory according to claim 12 wherein the pivot axis is generally vertical.

14. The universally mounted accessory according to claim 12 wherein the cantilever member is selectively retained within the transverse channel of the main support member.

15. The universally mounted accessory according to claim 12 wherein the accessory comprises a retaining post extending therefrom, the retaining post being sized to be received within an aperture formed in the cantilever member, the retaining post being selectively retained relative to the cantilever member to prevent the accessory from pivoting about the pivot axis.

16. The universally mounted accessory according to claim 12 wherein the main support member comprises a base support member releasably coupled to the lower end, the base support member having a mounting pad engageable with the floor of the pickup truck bed.

17. The universally mounted accessory according to claim 16, further comprising an adjustment shim disposed between the lower end and the base support, the adjustment shim varying an overall length of the main support member.

18. The universally mounted accessory according to claim 12 wherein the main support member comprises a top support member, the top support member having a mounting pad engageable with the upper horizontal portion of the sidewall of the pickup truck bed.

19. The universally mounted accessory according to claim 18 wherein the top support member comprises an adjustable length mechanism, the adjustable length mechanism varying an overall length of the main support member.

20. The universally mounted accessory according to claim 12, further comprising:
   an antifriction plate mounted between the swivel plate and the accessory.

* * * * *